United States Patent [19]

Chang

[11] Patent Number: 5,263,126
[45] Date of Patent: Nov. 16, 1993

[54] AUTOMATIC EXPERT SYSTEM

[76] Inventor: Hou-Mei H. Chang, 4600 140th Ave. N., Clearwater, Fla. 34622

[21] Appl. No.: 942,976

[22] Filed: Sep. 10, 1992

[51] Int. Cl.$^5$ .................................. G06F 15/18
[52] U.S. Cl. ................................. 395/51; 395/12; 395/60; 395/925; 395/600; 395/54
[58] Field of Search .................. 395/12, 22, 60, 51

[56] References Cited

U.S. PATENT DOCUMENTS

| | | | |
|---|---|---|---|
| 4,658,370 | 4/1987 | Erman et al. | 395/76 |
| 4,670,848 | 6/1987 | Schramm | 395/60 |
| 4,704,695 | 11/1987 | Kimura et al. | 395/54 |
| 4,783,752 | 11/1988 | Kaplan et al. | 395/64 |
| 4,829,450 | 5/1989 | Manthey | 395/60 |
| 4,866,634 | 9/1989 | Reboh et al. | 364/513 |
| 4,884,218 | 11/1989 | Agnew et al. | 395/54 |
| 4,903,215 | 2/1990 | Masuishi et al. | 395/52 |
| 4,912,648 | 3/1990 | Tyler | 395/61 |
| 4,918,620 | 4/1990 | Ulug | 395/75 |
| 4,924,408 | 5/1990 | Highland | 395/50 |
| 4,935,876 | 6/1990 | Hanatsuka | 395/51 |
| 4,937,755 | 6/1990 | Yokota et al. | 364/488 |
| 4,943,933 | 7/1990 | Miyamoto et al. | 395/54 |
| 4,949,278 | 8/1990 | Davies et al. | 395/11 |
| 4,959,799 | 9/1990 | Yoshiura et al. | 395/51 |
| 4,970,657 | 11/1990 | Wolf | 395/61 |
| 4,970,658 | 11/1990 | Durbin et al. | 395/76 |
| 5,021,992 | 6/1991 | Kondo | 395/1 |
| 5,043,915 | 8/1991 | Suwa et al. | 395/52 |
| 5,063,522 | 11/1991 | Winters | 395/51 |
| 5,119,470 | 6/1992 | Highland et al. | 395/64 |
| 5,182,793 | 1/1993 | Alexander et al. | 395/13 |
| 5,191,638 | 3/1993 | Wakami et al. | 395/51 |
| 5,195,172 | 3/1993 | Elad et al. | 395/50 |

OTHER PUBLICATIONS

Francioni et al., "A Software Engineering Tool for Expert System Design," IEEE Expert, Spring 1988, 33–41.

Dhar et al., "Knowledge-Based Decision Support in Business: Issues and a Solution," IEEE Expert, Spring 1988, 53–62.

Huang et al., "Efficient Computer Implementation of a Rule-Based Three-Term Controller," Proc. 27th Conf. on Decision and Control, Dec. 1988, 2247–2248.

Sheng et al., "A Framework to Support Managerial Activities Using Office Information Systems," Proc. 22nd Annual Hawaii Intl. Conf. on System Sciences, Jan. 1989, 532–540.

Carr, C., "Spreadsheet Sketches for Rule-Based Systems," AI Expert, Nov. 1989, 30–35.

Liskin, M., dBASE III Plus Made Easy, Osborne McGraw-Hill, 1988; 66–71, 82–86, 98–100, 181–190.

Ruth et al., 1st-Class Expert System Instruction Manual, 1989.

(List continued on next page.)

Primary Examiner—Michael R. Fleming
Assistant Examiner—Robert W. Downs

[57] ABSTRACT

A user-friendly expert system with new types of knowledge bases is disclosed. The major new components in the invented expert system are: A stored knowledge base in the form of an array, an input knowledge base in the form of a truth table or in some other user-defined forms, a transfer engine being a built-in computer program transferring the input knowledge base to the stored knowledge base, and an automatic inference engine being a built-in computer program reasoning with the stored knowledge base by a double loop. No matter what the size of the input knowledge base is, and no matter what the size of the input knowledge base is, and no matter what kind of knowledge is stored in it, the double loop always processes the inference automatically, and no compilation is necessary. Therefore, the inference engine is called the automatic inference engine and the system is called the automatic expert system.

5 Claims, 11 Drawing Sheets

OTHER PUBLICATIONS

Kerschberg et al., "FINEX: An Expert Support System for Financial Analysis", 7th Intl. Workshop, Expert Systems and Their Applications, 1987, 919-941.

Fischer et al., "Knowledge-Based Spreadsheets", Proceedings AAAI-88, Aug. 1988, 802-807.

Yasunobu et al., "Document Retrieval Expert System Shell with Worksheet-based Knowledge Acquisition Facility," Proc. 13th Annual Intl. Computer Software and Applications Conf., Sep. 1989, pp. 278-285.

Coyne, J. P., "The Desirability of Embedding An Expert System Shell Within A Relational DBMS," Proc. IEEE/ACM Intl. Conf. on Developing and Managing Expert Systems Programs, Sep. 1991, 12-14.

David Hu, C/C++ for Expert Systems, Chapter 1, (MIS Press).

Donald Waterman, A Guide to Expert Systems, Chapter 3, (Addison-Wesley Publ.).

Charles Forgy, Rete: A Fast Algorithm..., (Artificial Intelligence, 19 (1982), 17-37).

William Mark et al., Knowledge-Based Systems, (IEEE Expert, Jun., 1991, 12-17).

Roy Rada, Expert Systems in The UK, (IEEE Expert, Aug., 1990, 12-17).

Roy Rada et al., Directions for Expert Systems in The United Kingdom, (The World Congress on Expert Systems Proceedings, 1991, 62-68).

Hiroshi Motoda et al., The Current Status of Expert System Development and Related Technologies in Japan, (IEEE Expert, Aug., 1990, 3-11).

Fernando Alonso et al., Expert Systems in Spain, (The World Congress on Expert Systems Proceedings, 1991, 69-76).

Myron Chin et al., State-of-the-Art Review of Expert Systems... in The Caribbean, (The World Congress on Expert System Proc., 1991, 167-172).

Attribute-Value Table (AVT) 33

| ATTRIBUTE | ATTR_1 | ATTR_2 | | ATTR_J | | ATTR_N |
|---|---|---|---|---|---|---|
| ATTRIBUTE NAME | xxx | yyy | | jjj | | zzz |
| ATTRIBUTE TYPE | CHAR | NUMERIC | | CHAR | | CHAR |
| ATTRIBUTE LENGTH | 25 | 8 | | 19 | | 14 |
| VALUE-LIST | VAL_1[1]<br>VAL_1[2]<br>VAL_1[3] | VAL_2[1]<br>VAL_2[2]<br>VAL_2[3]<br>VAL_2[4]<br>VAL_2[5] | | VAL_J[1]<br>VAL_J[2]<br>VAL_J[3]<br>VAL_J[4] | | VAL_N[1]<br>VAL_N[2]<br>VAL_N[3]<br>VAL_N[4] |

Fig. 4

CODE TRUTH TABLE (CTT)

|   | 1 | 2 | J | | N |
|---|---|---|---|---|---|
| 1 | EC[1,1] | EC[1,2] | EC[1,J] | | EC[1,N] |
| 2 | EC[2,1] | EC[2,2] | EC[2,J] | | EC[2,N] |
| 3 | | | | | |
| | | | | | |
| I | EC[I,1] | EC[i,2] | EC[I,J] | | EC[J,N] |
| | | | | | |
| M | EC[M,1] | EC[M,2] | EC[M,J] | | EC[M,N] |

31

| | 1 | 2 | J | | N |
|---|---|---|---|---|---|
| | QC[1] | QC[2] | QC[J] | | QC[N] |

21

CODE QUERY LIST (CQL)

FLAG

| | FLAG |
|---|---|
| 1 | FLAG[1] |
| | |
| | |
| | |
| I | FLAG[I] |
| | |
| M | FLAG[M] |

51

ACTION TABLE (AT)

| SEQ | ACT |
|---|---|
| 1 | ACT[1] |
| | |
| | |
| I | ACT[I] |
| | |
| M | ACT[M] |

PRINTER TROUBLE SHOOTING
ACTION TABLE (AT)

| SEQ | ACTION STATEMENT |
|---|---|
| 1 | Power cable or power switch failure. |
| 2 | Out of paper. Load new paper. |
| 3 | Paper jam or paper oversize. |
| 4 | New cartridge required. |
| 5 | Data transmission error. |
| 6 | Mechanical error. |
| 7 | XON error. Restart power. |
| 8 | XOFF error. Restart power. |
| 9 | Fuse broken. Change new fuse. |

82

PRINTER TROUBLE SHOOTING
INPUT TRUTH TABLE (ITT)

| SEQ | POWER | ON LINE | ERROR | PAPER | BUZZER |
|---|---|---|---|---|---|
| 1 | OFF | OFF | OFF | OFF | OFF |
| 2 | ON | OFF | ON | ON | SOUND 2 TIMES |
| 3 | ON | OFF | ON | OFF | SOUND 3 TIMES |
| 4 | ON | OFF | BLINKS | | SOUND 4 TIMES |
| 5 | BLINKS | BLINKS | ON | | SOUND 5 TIMES |
| 6 | BLINKS | OFF | OFF | | OFF |
| 7 | | BLINKS | OFF | | SOUND 3 TIMES |
| 8 | | BLINKS | BLINKS | | SOUND 2 TIMES |
| 9 | BLINKS | OFF | BLINKS | | SOUND 2 TIMES |

ATTRIBUTE-VALUE TABLE (AVT)

| | ATTR_1 | ATTR_2 | ATTR_3 | ATTR_4 | ATTR_5 |
|---|---|---|---|---|---|
| ATTRIBUTE NAME | POWER | ON LINE | ERROR | PAPER | BUZZER |
| ATTRIBUTE TYPE | CHAR STRING | CHAR STRING | CHAR STRING | CHAR STRING | CHAR STRING |
| ATTRIBUTE LENGTH | 8 | 8 | 8 | 8 | 16 |
| VALUE-LIST | OFF | OFF | OFF | ON | OFF |
| | ON | BLINKS | ON | OFF | SOUND 2 TIMES |
| | BLINKS | | BLINKS | | SOUND 3 TIMES |
| | | | | | SOUND 4 TIMES |
| | | | | | SOUND 5 TIMES |

83

CODE TRUTH TABLE (CTT)

| | | | | | |
|---|---|---|---|---|---|
| 1 | 1 | 2 | 3 | 4 | 5 |
| 2 | 2 | 1 | 1 | 0 | 1 |
| 3 | 2 | 1 | 2 | 1 | 2 |
| 4 | 2 | 1 | 2 | 2 | 3 |
| 5 | 3 | 2 | 3 | 0 | 4 |
| 6 | 3 | 1 | 2 | 0 | 5 |
| 7 | 0 | 2 | 1 | 0 | 1 |
| 8 | 0 | 2 | 3 | 0 | 3 |
| 9 | 3 | 1 | 3 | 0 | 2 |
| | | | | | 2 |

84

CODE QUERY LIST (CQL)

| J | 1 | 2 | 3 | 4 | 5 |
|---|---|---|---|---|---|

AUTOMATIC EXPERT SYSTEM

BACKGROUND OF THE INVENTION

The present invention relates to the field of knowledge-based expert systems. Knowledge-based expert systems are computer systems which perform reasoning by using inference engine, knowledge base (KB), and requested data. They perform reasoning in the same manner as human experts, because human experts' knowledge is stored in the knowledge base. Different tasks need different knowledge bases which are created by experts in different domains. Currently, most knowledge-based expert systems are created by using knowledge engineering tools, commonly called expert system shells.

Expert system shells simplify the process of building expert systems. In most of current expert system shells, the inference engine is built-in. Building an expert system in any domain is reduced to building a knowledge base in the specific domain.

The build-in inference engine is a computer program written by C, Ada, Lisp, Prolog, or other programming languages. It can reason the knowledge base created in a required format. Currently, there are three types of knowledge bases:

1. Rule-based: A set of 'if-then' rules;
2. Frame-based: Structured facts and relations; and
3. Logics: Predicates and values.

Among these three types, the rule-based knowledge base is the most commonly used one. In some applications, knowledge bases are very big, and may contain thousands of 'if-then' rules. They are built by the cooperation of domain experts and knowledge engineers, who are software engineers familiar with the structures and requirements of expert systems and the expert system shells. The 'if-then' rules or frames of knowledge bases generally are totally different from any knowledge representation formats in domain experts' professional or daily life. Domain experts need the help of knowledge engineers in the process of design and creation of any knowledge bases. In order to be executed, the created knowledge base needs to be compiled and integrated with the inference engine.

The cooperation of domain experts and knowledge engineers is the most time-consuming, and maybe the most money-consuming process. And it is the most difficult part in building the expert system. As human knowledge is growing up rapidly, the knowledge base needs to be modified frequently. In modification phase, the cooperation of domain experts and knowledge engineers is still necessary. Therefore, since 70's, it is believed that the process, which involves domain experts and knowledge engineers working together to design, construct, and modify the domain knowledge base is the main bottleneck in the development of expert systems.

Until today, the bottleneck problem remains unsolved. Most expert systems and commercial expert system shells still use 'if-then' rule-based knowledge bases. And domain experts and knowledge engineers still have to work together to design and create domain knowledge bases. Not only the commercial expert system shells in the market, but also the recently applied and approved patents, such as U.S. Pat. No. 4,970,657 (Expert Knowledge System Development Tools, U.S. Advanced Technology, 11/90), U.S. Pat. No. 4,970,658 (Knowledge Engineering Tools, Tesseract Corp, 11/90), and U.S. Pat. No. 4,912,648 (Expert System Inference Engine, IBM, 3/90), still use the 'if-then' rule-based or frame-based knowledge base structures.

Most current marketing expert system shells are designed for the knowledge base in the form of 'if-then' rules. They need not only an editor screen to input and modify the rules in the knowledge base but also a program to compile, integrate, and link the input knowledge base and the stored inference engine together. (The Rete algorithm developed and published by Forgy in 1982 is a widely used example, but it is pretty complicated.)

OBJECT OF THE INVENTION

The principal object of this invention is to create a new type of expert system which is user-friendly. An input knowledge base is in a user-friendly format, e.g., in the form of a truth table. This is a new type of knowledge base. No more 'if-then' rules will be in the input knowledge base.

Another object of this invention is to create a working knowledge base in the form of a two-dimensional array. Values in this array are codes of the corresponding values in the input truth table. Working on this array of codes will be much easier and faster than on other forms of knowledge bases.

The third object is to create a double loop in the programming language of the inference engine. The double loop can reason the array by performing a true/-false test of every entry of the array automatically no matter what the size and contents of the input knowledge base are.

SUMMARY OF THE INVENTION

The invented automatic expert system comprises:
1. A stored knowledge base called code truth table. It is a two-dimensional array of numbers or characters. This is a new type of knowledge base stored in the storage of computer. It is the working knowledge base.
2. An input knowledge base. This knowledge base is not a set of 'if-then' rules. It is a truth table called input truth table. Its structure is just like a table in any relational database.
3. An automatic inference engine (AIE). This is a new type of inference engine. It reasons any stored knowledge base by a double loop without compilation. No matter what the size of the input knowledge base is, and no matter what kind of knowledge is stored, the double loop always proceeds the inference automatically. Therefore, the inference engine is called the automatic inference engine and the system is called the automatic expert system.

The value of each entry of the code truth table (CTT) is a code of the value of its corresponding entry of the input truth table. This is the reason why it is called the code truth table. The CTT in the form of a two-dimensional array rather than 'if-then' rules or other formats has advantages. On the one hand, in any computer programming languages, it is easy to have a universal program with a double loop ("while loop", "for loop", or others) in the AIE to test the true/false of all entries of a two-dimensional array. On the other hand, the CTT of this type is easy to be transferred from the input truth table. Therefore, domain experts can input knowledge without or with minimum help of knowledge engineers, and the bottleneck problem of knowledge acquisition mentioned above is solved.

A truth table is a relation in relational algebra or an object in object-oriented design. Each column of the table corresponds to an attribute, and an attribute may take a value from a set of permissible values. Each row of the table is called a record or an occurrence, which corresponds to an instance of the real world. Each column of the table is of different data types and different lengths.

To express any domain knowledge in the form of a truth table is much easier than in the form of a set of 'if-then' rules for most domain experts. They can do it by themselves with minimum training, and the knowledge acquisition time can be reduced.

Different columns have different data types and lengths in a truth table, but have the same data type and length in an array. Therefore, a table of many rows is not so easy to be handled as a two-dimensional array. The true/false test of each entry of the array can be done one by one by a double loop automatically. But it can't be done to a truth table, because no simple double loop can be applied. This is the reason why a truth table is used as the input knowledge base and an array translated from it is used as the working knowledge base.

DESCRIPTION OF THE INVENTION

1. The invented automatic expert system is a new type of knowledge-based expert system (KBES) in digital computers. Its characteristic features are: (1) Its input knowledge base is in a user-friendly format, e.g., in the form of a truth table. (2) It reasons the knowledge base automatically. The invented expert system comprises the following parts as shown in FIG. 3:

(a) An input knowledge base (IKB) in the form of a truth table is called input truth table (ITT);

(b) An Attribute-value table (AVT) is defined and inputted by the user, and the format of the ITT is defined by the AVT;

(c) A stored knowledge base in the form of a two-dimensional array is called the code truth table (CTT). Each entry of the CTT is a code of the value of the corresponding entry of the ITT;

(d) A transfer engine (TE), which is a build-in computer program, translates values in the ITT to their corresponding codes in CTT and translates the codes in CTT back to its corresponding values in ITT by the aid of the AVT; and (e) An automatic inference engine (AIE), which is a build-in computer program, reasons the CTT automatically.

The structures and features of each part are explained below:

2. The input truth table (ITT) is the input knowledge base (IKB). It is a table comprising of columns and rows. A truth table is defined as a relation in relational algebra and its format is defined by a set of column names, column types, and column lengths (or called attribute names, attribute types, and attribute lengths). Each column can be called an attribute. For each attribute name, there is a set of permissible values for the associated column. This set of values is called the domain of the attribute, and is listed in the associated value-list of each attribute in the AVT. Each row in the table is called a tuple. The intersection of a column and a row is called the entry of the truth table. Each entry takes a value from its domain, i.e., from the associated value-list. The value of each entry will be compared with a given value in the querying session. If they match each other then the entry is called true. If they mismatch each other then the entry is called false. If the value of the entry is blank. The entry is called unavailable (N/A).

If any entry in a row of an ITT is false, then this row is defined as false. If at least one entry is true and all others in the row of the ITT are true or unavailable then this row is defined as true. If any row is true, then an action will be taken. This means that an ACT(I) in the action table (AT) corresponding to this row number will be fired (see FIG. 2).

From the viewpoint of object-oriented design, a table is an object. So, the ITT is an object. Its columns are called attributes and rows are called occurrences. Obviously, an occurrence corresponds to a case in the real world.

The structure of the ITT is defined by the inputted AVT, which will be discussed later. An example of the ITT is shown in FIG. 8a.

A truth table is a whole input knowledge base, which includes no 'if-then' rules. This knowledge expression is very straightforward and easily understood by experts in different areas. The example in FIGS. 8a and 8b shows how this knowledge base is created by the domain expert without the aid of the knowledge engineer. This is the most significant improvement introduced in the present invention upon the current expert systems.

If there are more than one input truth table then there are more than one corresponding code truth table in the computer storage. If reasoning of the first code truth table fails (i.e., all rows equal false) then the system goes to reason the second one, and so on.

3. The attribute-value table (AVT). The format of the ITT is defined by the AVT, because the names, types, lengths, and domains (value-lists) of all attributes are inputted by the user in the AVT. The total attribute number and the total row number can be stored in the AVT too. A structure of the AVT is shown in FIG. 4 and an example of the AVT is shown in FIG. 8b. An input procedure is to input an AVT to define the format of an ITT first, and then select values for entries of the ITT from their corresponding value-lists in the AVT. This procedure is very similar to the input procedure of any relational database management system (RDBMS).

A code of each value is defined by the value-list of each attribute in the AVT. The easiest way is to define the sequence number of the value in its value-list as its code (at this time, '0' can be assigned as the code of N/A). But any other number defined by ANY other operations or calculations can be taken as its code too.

4. The code truth table (CTT). The CTT is the heart of this invention and is a stored KB corresponding to the input KB. The format of the CTT is a two-dimensional array, and it has the same total column number and total row number as the ITT. Each entry of this array is a code of the value of the corresponding entry in ITT. The corresponding entry is defined as the entry of ITT, which has the same column number and the same row number as the entry of the CTT.

In input phase, when the total attribute number N and the maximum row number M are stored, a CTT in the form of a two-dimensional array of numbers with size M times N is created. When a value of an attribute is selected by the user from the value-list and stored in an entry of the ITT, a code associated with the selected value in the value-list is stored in the corresponding entry of the CTT. Once the input process of the ITT is finished, the input process of the stored knowledge base CTT is finished at the same time.

The difference between the CTT and the ITT is that: A CTT is an array of numbers but an ITT is a table. Attributes of a table can be of different types and lengths. Such data structure of ITT is called the 'record' in programming language Pascal, and is called the 'struct' in programming language 'C.' In many different computer programming languages, there exist 'loop' procedures to scan all entries of an array one by one, because all entries of an array have the same data type and the same data length. But there is no simple method to do the same thing on a table directly. This is the reason why the array-formed CTT is created as a stored knowledge base and working knowledge base.

5. The transfer engine (TE). A TE is a build-in computer program. In input phase, it transfers the ITT to the CTT by translating each value to its associated code. In querying phase, the AIE sends code requests to the user and the user responds with a value. At this time, TE translates the value to its associated code to AIE.

6. The automatic inference engine (AIE). The invented expert system has an automatic inference engine. It reasons the stored knowledge base automatically.

Reasoning process. The reasoning process of the AIE is as follows: The AIE scans every entry of the two-dimensional array-formed CTT by a double loop and performs a true/false test of each entry by querying. If any entry matches the corresponding code obtained from querying, then this entry is defined as true; if any entry mismatches the corresponding code obtained from querying, then this entry is defined as false.

If any entry of a row of a CTT is false then the row is defined as false; if at least one entry of a row is true and all other entries in this row of the CTT are true or blank (or '0'), then the row is defined as true. If any row of the CTT is proved to be true then an action will be taken. The action is stored in the ACT column in the AT with the same row number.

In the reasoning process, the AIE compares the code in an entry of CTT with the code obtained by querying. The code in CTT is translated from the value of the corresponding entry in ITT, and the code obtained by querying is translated from the value of the answer by the same translation format. Therefore if the codes match (or mismatch) each other then the values match (or mismatch) each other. If a row in CTT is true (or false), its corresponding row in ITT is true (or false). Therefore we can reason CTT instead of ITT and obtain the same result.

The AIE reasons different CTTs automatically, because the CPU of a computer processes the CTT by a double loop automatically, if the total attribute number and the total row number are given.

Chaining. The AIE can do either forward chaining or backward chaining reasoning. The algorithms are shown in FIGS. 7a, 7b, 7c, and FIG. 5. The AIE tests all entries of the CTT by a double loop. If the integer I is used as the row indicator, different rows have different I; and the integer J is used as the column indicator, different columns have different J. In backward chaining, the J-loop is the inner loop and the I-loop is the outer loop (see FIG. 5) and the AIE tests the two-dimensional array row by row. In forward chaining, the I-loop is the inner loop and the J-loop is the outer loop (see FIGS. 7a, 7b, and 7c) and the AIE tests the two-dimensional array column by column.

7. The action table (AT). The action, which will be taken when a row of ITT is true, is stored in the ACT column of the AT. The structure of an AT is shown in FIG. 2. The action stored in each row of the ACT column is a set of statements or a pointer pointing to another table storing action statements. Sometimes, the AT can be merged into the ITT by adding an ACT column to the ITT.

8. The automatic expert system. 'Automatic' means that once an AVT and an ITT are inputted by the user, no matter what the size of the ITT (how many columns and how many rows) is and no matter what the attribute names, types, lengths, and values of each entry are, the AIE can always automatically reason the ITT without compilation or integration. This is the big difference between the invented expert system and the traditional expert systems.

9. The Knowledge representation. As mentioned above, the code of each value can be a number, and so, each row of a CTT can be a string of numbers. Accordingly, the stored knowledge base becomes a set of strings of numbers, and the knowledge is represented by a set of strings of numbers.

If the lengths of value-lists of all attributes are equal to or less than the number of characters (or printable characters) in the ASCII table or some other character code tables, then all codes in the CTT can be expressed as characters (or printable characters) by the using of the ASCII table. And the string of numbers can be expressed as character strings (or character strings of printable characters). Therefore, knowledge is expressed as a set of character strings.

10. Other formats of the input knowledge base. Any knowledge representation that can be transferred to the ITT by a set of computer programs can be used as an input knowledge base format of the invented automatic expert system. A method to do this is to build a preprocessor to transfer the knowledge base format to an ITT, and then the TE can transfer it to the CTT.

Any knowledge representation that can be transferred to the CTT by a set of computer programs can be used as an input knowledge base format of the invented automatic expert system. A method to do this is to build a TE to transfer the knowledge base format to the CTT, and then the AIE can reason it automatically. A block diagram of the invented expert system of this type is shown in FIG. 1.

11. The expert system shells. Currently, the knowledge bases of expert systems in the market and in research comprise of 'if-then' rules, frames or some other structures. To create and modify such expert systems, some special expert system shells are necessary. On the one hand, these shells allow the user to input the special formed knowledge base as an editor screen; on the other hand, these shells compile and integrate the knowledge base with the inference engine together and make them executable by the computer.

The input knowledge base of the present invention is in a user-friendly form, e.g., in the form of a truth table. The stored knowledge base is in the form of a two-dimensional array. The AIE can reason the stored knowledge base automatically, no matter what the input knowledge base is. And compilations and integrations of the CTT and AIE are no more necessary. The stored knowledge base and the inference engine become two independent parts stored in the computer. At the same time, an input truth table is of the same format as a table in any relational database, and no special editor screen is necessary to input and modify the input knowledge base.

Therefore, the shell of the invented expert system degenerates to a regular editor of a database management system (DBMS) or even a word processing software, in which only the truth table and the AVT are to be inputted and modified.

In case the knowledge base needs to be saved, the user can store the CTT in a file instead of ITT, because the size of a CTT is much smaller than an ITT. This method not only saves computer storage but also makes the system run faster. When a reasoning process starts, the AIE reads the file and puts it to the CTT directly and no translation is necessary. When the user wants to read or modify it, the TE can translate it back to the user input format.

12. An example of real design. FIGS. 8a and 8b show an example of the real design of a printer trouble shooting expert system. The input truth table (ITT) and the action table (AT) shown in FIG. 8a are created by the printer technician and the hardware engineer for the user of the printer. In the creation phase of this input knowledge base, no help from any knowledge engineer is provided.

The input process of this printer trouble shooting expert system is as follows: First, create an AVT 83 as shown in FIG. 8b, and then input the ITT 81 and the AT 82. Because the AVT is stored, a CTT 84 is created in the input process of the ITT by the TE. But the CTT is stored inside the storage of the computer and not shown to the user. Once the CTT is created, a CQL 85 is created by the AIE and the AIE will reason the CTT automatically.

BRIEF DESCRIPTION OF THE DRAWINGS

FIG. 4 shows the structure of an attribute-value table.

FIG. 6 shows the structures of four important arrays used in the forward chaining, FIGS. 8a and 8b show a printer trouble shooting expert system as an example. The structures and relationships of the ITT, the AVT, and the CTT are displayed.

DETAILED DESCRIPTION OF THE DRAWINGS

Figure 1:
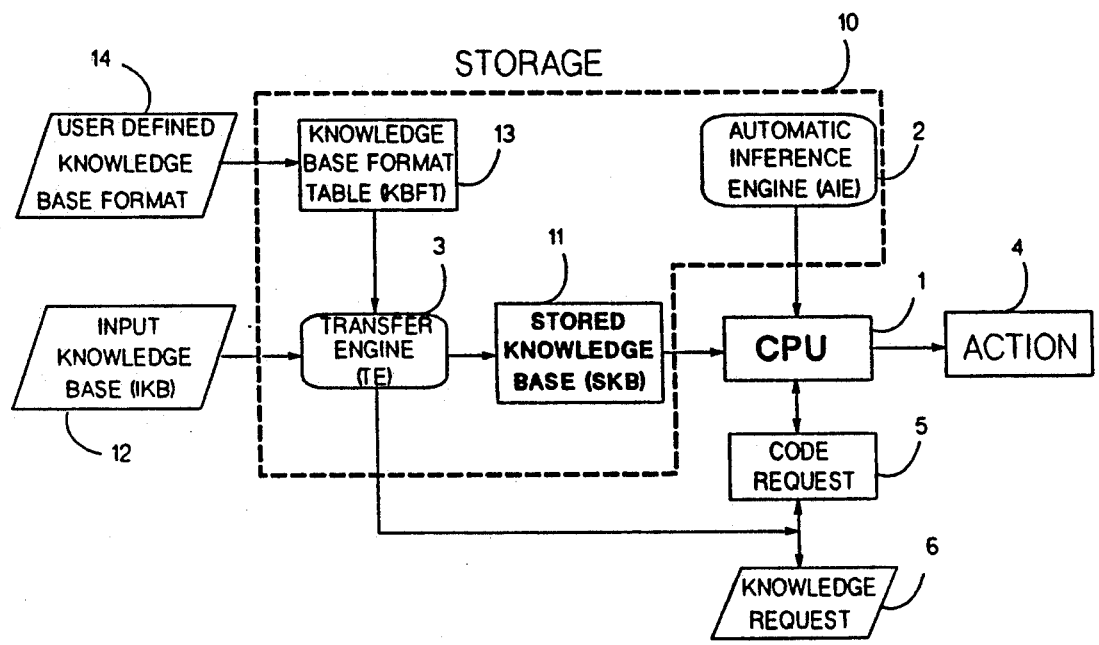
FIG. 1 is a block diagram of the invented automatic expert system.

FIG. 1 is a block diagram of the invented automatic expert system. An automatic inference engine (AIE) 2 and a transfer engine (TE) 3 are build-in programs in the computer storage 10. A stored knowledge base (SKB) 11 in the form of an array is a working knowledge base. Through the CPU 1, AIE 2 reasons SKB 11 by a set of loops in the computer program. TE 3 transfers an input knowledge base (IKB) 12 to SKB 11 by the using of a user-defined knowledge base format table (KBFT) 13. And KBFT 13 is inputted from a user-defined knowledge base format 14.

In querying phase, when AIE 2 needs data from the user, it sends a code request 5 through CPU 1. TE 3 translates it to the user-defined knowledge format to the user as the knowledge request 6. The response will be translated back to the code by TE 3 and sent back to AIE 2. Finally, if a result is found in SKB 11, CPU 1 of the computer will perform an action 4. The action may be an action instruction printed on the screen or sent to the printer, or may start some other computer programs, etc.

Figure 2:
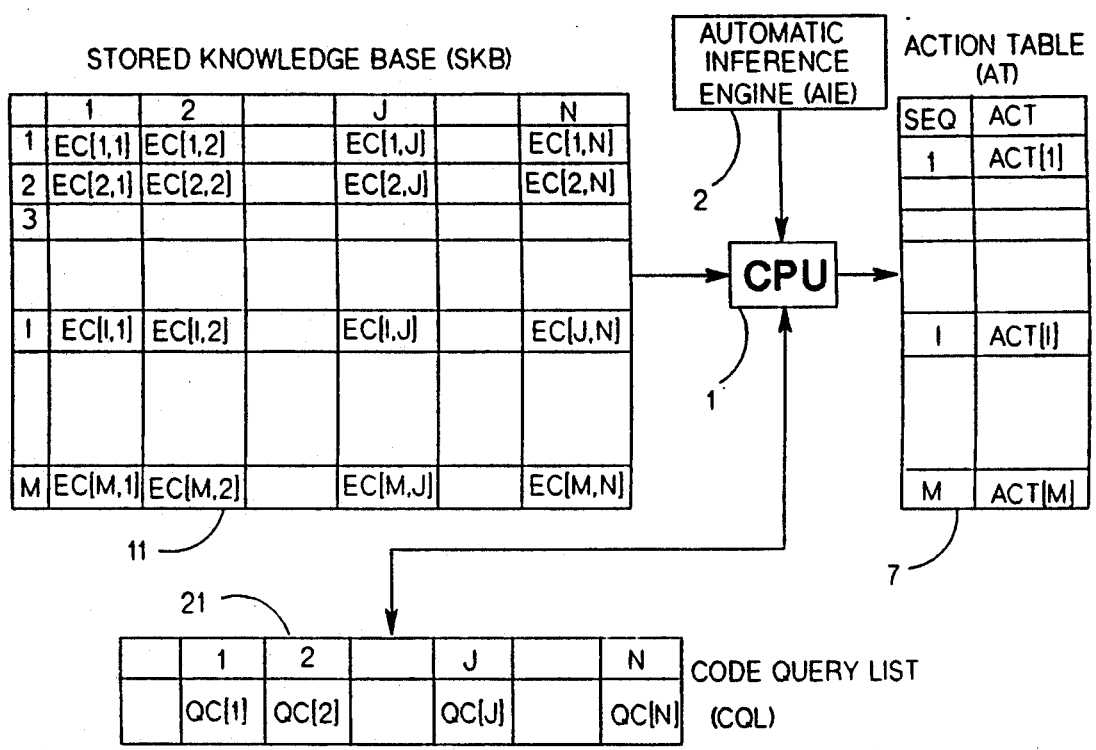
FIG. 2 shows the detailed structures of a stored knowledge base, a code query list, and an action table.

FIG. 2 shows the detailed structure of a stored knowledge base (SKB) 11, a code query list (CQL) 21, and an action table (AT) 7. SKB 11 is the heart of this invention. It is displayed as a two-dimensional array stored in the computer storage and it is the working knowledge base. Entries of this array are expressed as EC(I,J) (Entry Code). Its size is M rows times N columns, where M and N can be any positive integers. The only limitation for M and N is the size of the computer storage.

Code query list (CQL) 21 is a temporary one-dimensional array created by AIE 2 in the initialization phase of a process. It contains N entries called QC(J) (Query Code), and the number N is the same as the total number of attributes in SBK 11. Its structure is just like a single-rowed SKB, and its entries are of the same format as that of SKB 11. Codes requested in the querying phase will be stored in CQL 21 temporarily. And the reasoning process is to compare each occurrence of SKB 11 with CQL 21, and finally find out the occurrences that match CQL 21.

Another one-dimensional array is the action table (AT) 7. It has M entries ACT(I), and each entry corresponds to a row in SKB 11. If row I of SKB 11 is true, then ACT(I) in AT 7 will be fired. All ACT(I) in AT 7 are inputted by the user. Therefore, what action will be performed if row I is true is upon the decision of the user.

Figure 3:
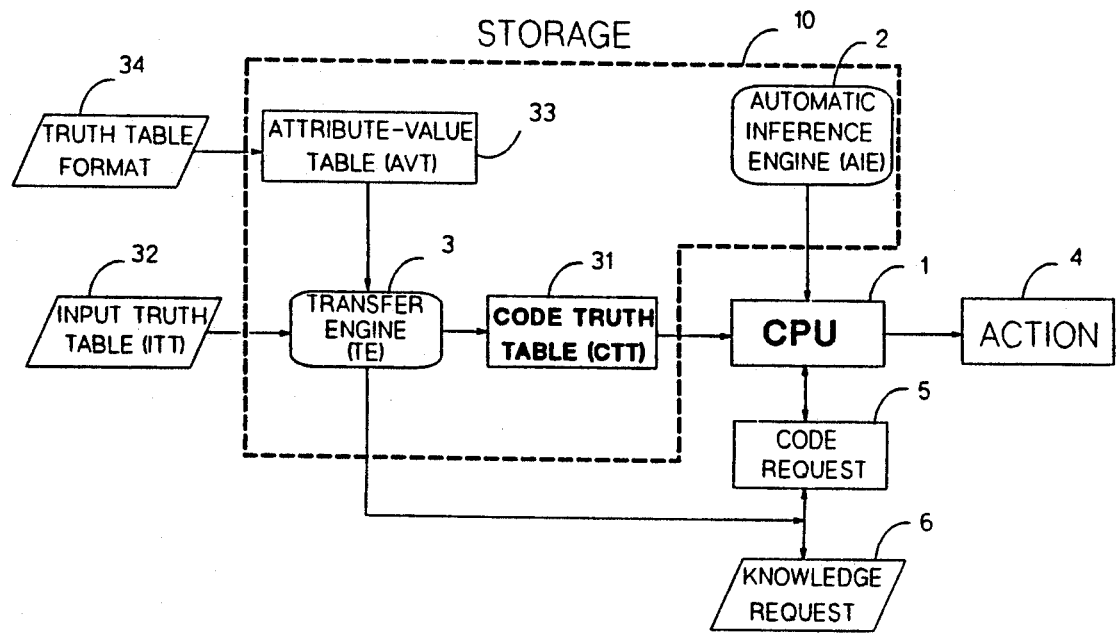
FIG. 3 is a block diagram of the invented automatic expert system in input truth table format.

FIG. 3 is a block diagram of the invented automatic expert system in input truth table format. Truth table as a knowledge representation is much easier to be understood than 'if-then' rules and it is a frequently used knowledge representation method by different domain experts. IKB 12 in FIG. 1 becomes an input truth table (ITT) 32 in FIG. 3; and the KBFT 13 in FIG. 1 becomes an attribute-value table (AVT) 33 in FIG. 3, which is defined and inputted by the user. SKB 11 in FIG. 1 is shown as a code truth table (CTT) 31 in FIG. 3. CTT 31 is in the form of a two-dimensional array of numbers, and each entry of CTT 31 is a code of the value in the corresponding entry of ITT 32. The code is defined by AVT 33 and will be discussed in FIG. 4. AIE 2 has a double loop in its program and can reason CTT 31 automatically without compilation and integration. The other blocks are the same as in FIG. 1.

FIG. 4 shows the structure of an attribute-value table (AVT) 33. The total column number N, the total row number M, attribute names, attribute types, attribute lengths, and attribute domains of ITT 32 are defined and inputted by the user in AVT 33. The permissible values of each attribute are called the attribute domains. All attribute domains are listed as the value-lists. Each value in the value-list takes a number as its code. The codes are stored in CTT 31.

Figure 5:
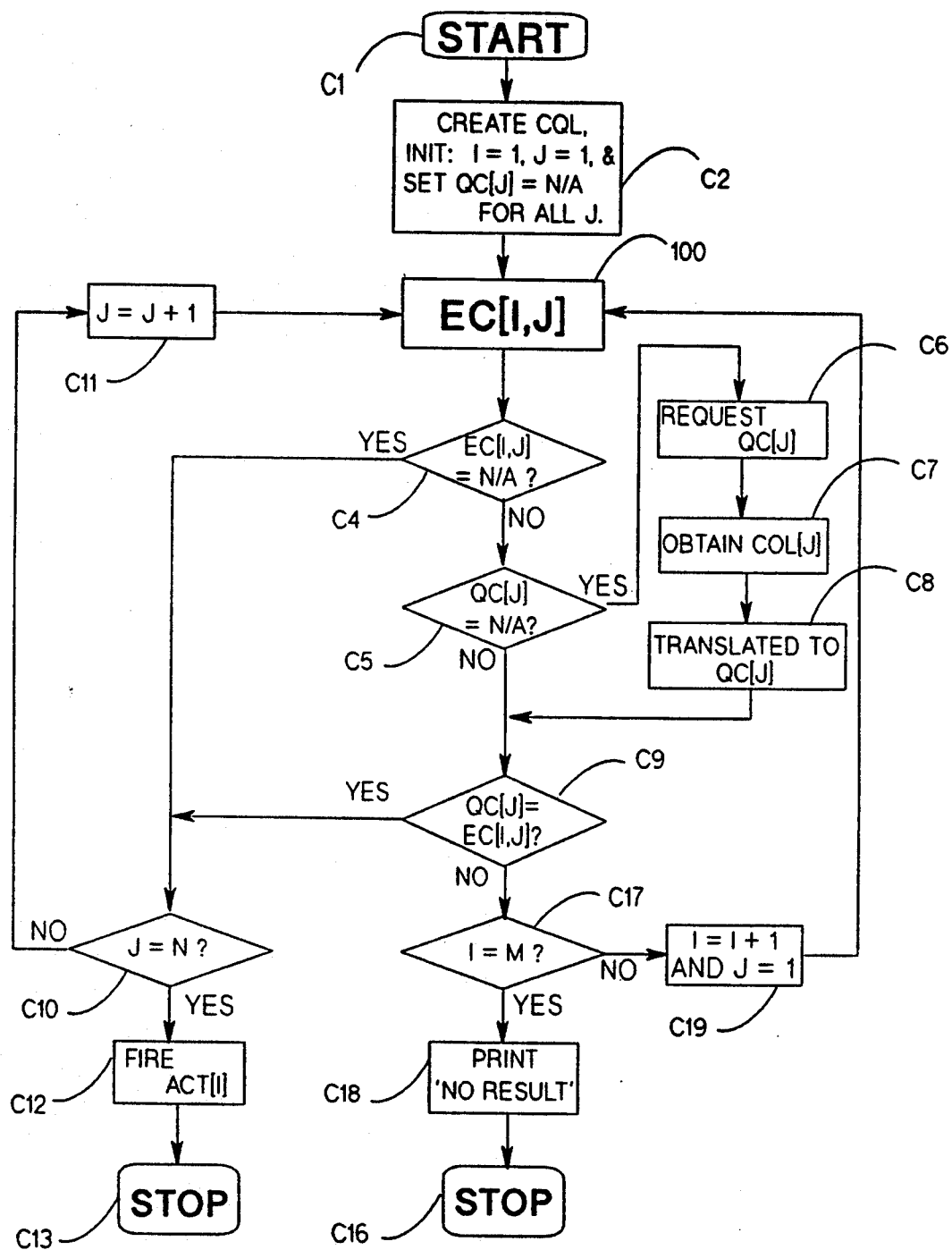
FIG. 5 is the flowchart of an automatic inference engine (AIE) using backward chaining.

FIG. 5 is a flowchart of an automatic inference engine (AIE) using backward chaining. Loop indicators I and J are initiated to 1, and all entries QC(J) of the temporary one-dimensional array CQL are initiated to N/A by AIE as shown in C2. After initiation, AIE goes to block 100, and works on the entry EC(I,J) of CTT. The test process is to compare each row of CTT with the temporary one-rowed array CQL.

Blocks C4, C5, C6, C7, and C8 are querying blocks. In block C4, AIE checks the availability of EC(I,J). If EC(I,J) is N/A, that means a true/false test is not necessary, AIE goes to the next entry, i.e., goes to C10. If EC(I,J) is available (not N/A), the availability of QC(J) of CQL is checked in block C5. If QC(J) is available, then AIE compares EC(I,J) with QC(J) in block C9; otherwise AIE sends data request C6 to the user. The answer in C7 is a value of the attribute instead of its code. Therefore, it is translated to its code in C8 by TE and stored in QC(J) of the CQL.

The comparison between EC(I,J) and QC(J) is performed in block C9. If they match each other then AIE goes to block C10 to select the next entry. In C10, if J does not equal N, that means EC(I,J) is not the last entry of the row, AIE assigns J=J+1 as shown in C11 and goes to the next entry of the same row. If J=N, that means EC(I,J) is the last entry of row I, and hence row I is true. Therefore, ACT(I) in the AT is fired and printed in C12, and then the system stops.

In block C9, if EC(I,J) does not match QC(J) then AIE goes to block C17 to test if it is the bottom row. If it is the bottom row, then 'NO RESULT' will be printed in C18 and the system stops. If it is not the bottom row, then that means this row is false, AIE goes to the next row and repeats the whole process. Therefore, AIE assigns I=I+1 and J=1 in block C19 and restart the test process of the next row.

FIG. 6 shows the structures of four important arrays used in the forward chaining. CTT 31 is a two-dimensional array of size N times M. Each entry EC(I,J) is a number, which is a code of the value of the corresponding entry of IKB 12 (see FIG. 1). CQL 21 is a temporary one-dimensional array of length N. Actions need to be performed are stored in the ACT column of AT 7. A FLAG array 51 is created at the beginning of each reasoning process for the forward chaining process, and its length is M. FLAG(I) is an integer. It corresponds to row I in CTT 31, and is a true/false indicator of row I. In reasoning process, all FLAG(I)s are initialized to zeros. If any row of CTT 31 is proved to be false, then the FLAG(I) corresponding to this row will be set to a positive number. The non-zero integer of FLAG(I) indicates that this row is a dead row, and no more test for this row is necessary. After the completion of the forward chaining reasoning, only rows in CTT 31 with corresponding FLAG() =0 are true, and all others are false.

Figure 7A:
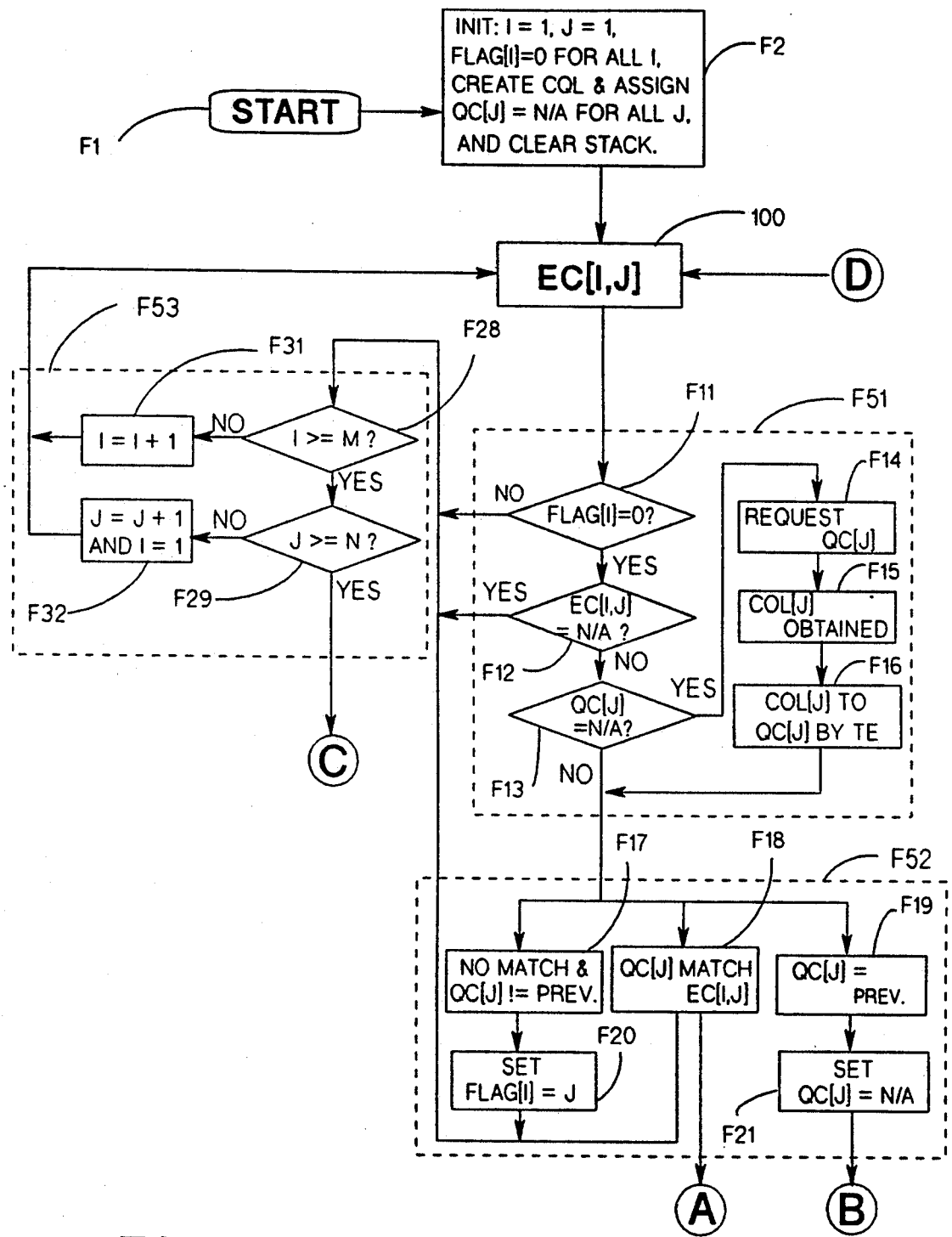
FIGS. 7a, 7b, and 7c show the flowchart of a real algorithm of an AIE using forward chaining.
Figure 7B:
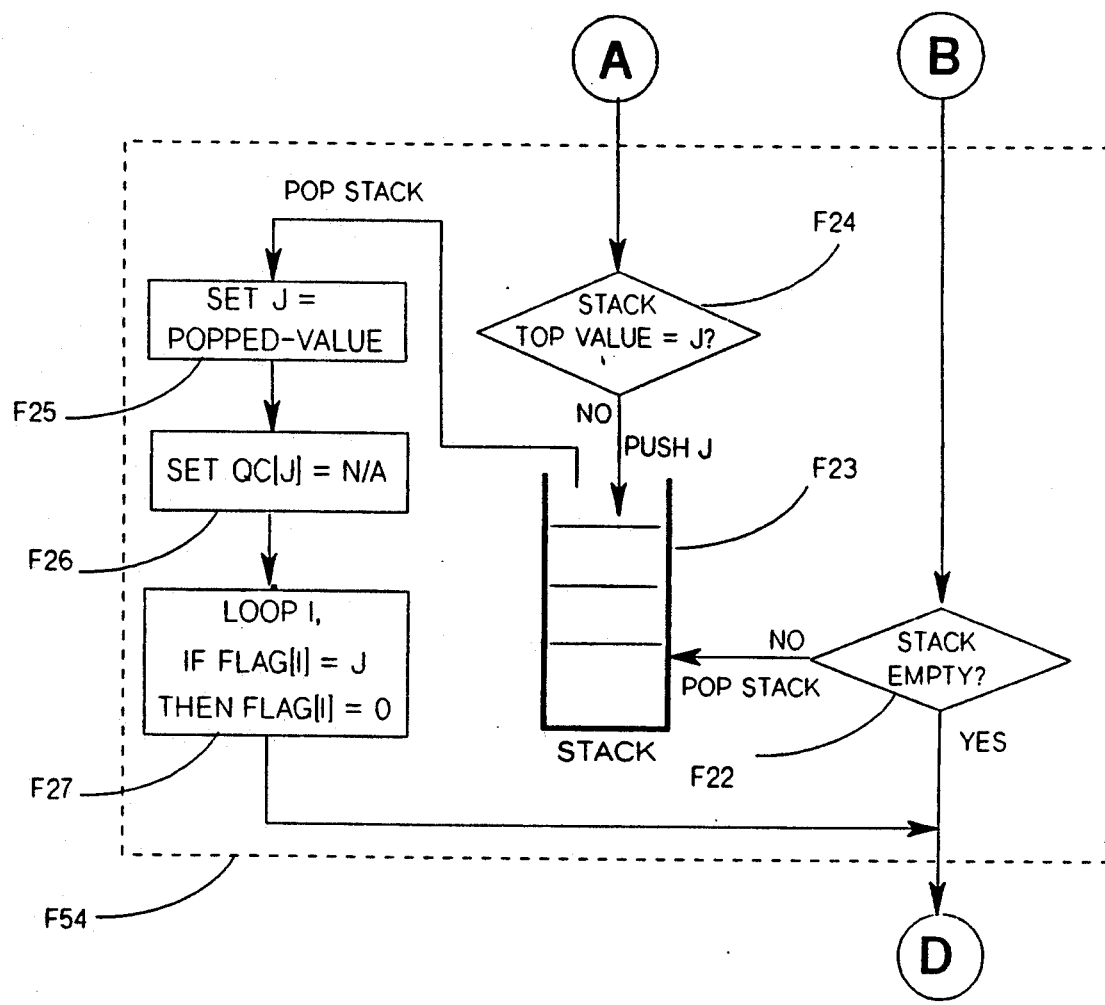
Figure 7C:
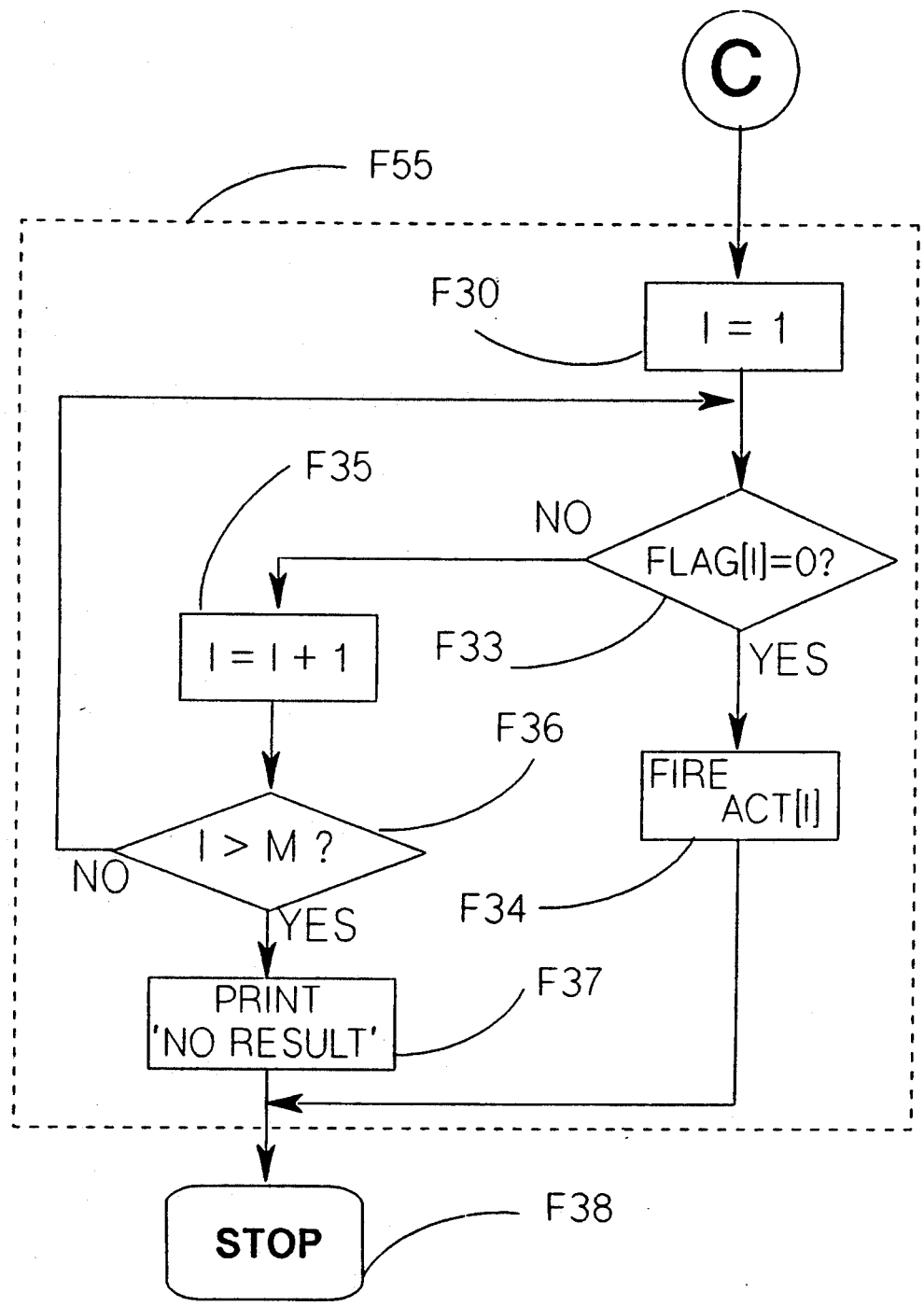

FIGS. 7a, 7b, and 7c show a flowchart of a real algorithm of the forward chaining AIE. There are five main parts in the flowchart, and each one is fenced by broken lines. They are a querying block F51, a matching block F52, a looping block F53, a stack block F54, and a FLAG block F55. Where F51, F52, and F53 are shown in FIG. 7a, F54 is shown in FIG. 7b, and F55 is shown in FIG. 7c. The functions of each block are as follows:

FIG. 7a. Initializations are performed in block F2. After initialization, AIE goes to work on the entry EC(I,J) in block 100. In forward chaining, AIE tests the EC(I,J) column by column.

(a) The querying block F51. In F51, three tests in F11, F12, and F13 are performed first. If FLAG(I) is not 0 or EC(I,J)=N/A, then the AIE goes to the next row by processing block F28. Otherwise, the availability of QC(J) of the CQL is tested in block F13. If QC(J) is available, then the AIE goes to the matching block F52 to do the comparison between QC(J) and EC(I,J) directly; otherwise, the AIE sends data request F14 to the user. The answer in F15 is a value of the attribute instead of its code. Therefore, the value is translated to its code in F16 by TE and is stored in QC(J).

(b) the matching block F52 has three branches. They are:

(1) F18: In case QC(J) matches EC(I,J), AIE goes to block A and then from block A in FIG. 7b goes to the stack block F54 to push J and QC(J) into the stack. After that AIE goes to the looping block F53.

(2) F17: In case QC(J) mismatches EC(I,J) and QC(J) doesn't equal "previous menu", AIE sets FLAG(I)=J in F20 to disable row-I and then goes to the looping block F53.

(3) F19: In case QC(J)="previous menu", AIE assigns QC(J) to N/A in F21, and then goes to block B and then from block B in FIG. 7b goes to the stack block F54 and pops the stack F23.

(c) The looping block F53. The looping block F53 is used to decide which entry of CTT is the next entry. If the bottom-row-test (I>=M?) in F28 is false, that means row-I is not the bottom row, then AIE assigns I=I+1 in block F31 and goes to the entry of the same column of the next row. If it is the bottom row, but the last-column-test (J>=N?) in block F29 is false, then AIE goes to the next column of the first row using the assignment in block F32. If column-J is the last column of the bottom row, then all entries have been tested and the test process is finished. AIE goes to block C and then from block C in FIG. 7c goes to the FLAG block F55.

FIG. 7b shows the stack block F54. This is a supplementary block, which provides a stack F23. The previous data are stored in stack F23. And if the user wants to go back one step or several steps, he/she can find out the records from the stack. A push-stack function and a pop-stack function are stored in the AIE. In push-stack process, AIE comes from block A, and a stack-top-test is done in F24. If the pushed value J doesn't equal the stack top, then this value is pushed into the stack F23. If it equals the stack top then nothing will be done. In pop-stack process, AIE comes from block B and the empty-stack-test is done in F22. If the stack is not empty, the top value of the stack F23 should be popped out. AIE then assigns J=popped value in F25 and QC(J)=N/A in F26. At the same time, AIE goes to F27 to assign all FLAG(I)=0, if they are disabled in the previous step. After the assignment or if the stack is empty by the test in F22, AIE goes to block D and from block D in FIG. 7a goes back to EC(I,J) and restarts all processes.

FIG. 7c shows the FLAG block F55. The goal of this block is to do another I-loop to find out the first live row or all live rows in CTT. AIE comes from block C and assigns I=1 to start the I-loop in F30 and tests if FLAG(I)=0 in F33. If the answer is yes, then this row is true and its corresponding ACT(I) will be fired in F34. If the answer is no, this is a dead row. AIE assigns I=I+1 in F35 and tests if I>M in F36. If answer is no, then AIE goes to the next FLAG(I); otherwise, row-I is the bottom row and no more row exits. Therefore, no row satisfies FLAG(I)=0, and 'NO RESULT' is printed in F37 and the system stops.

FIGS. 8a and 8b show a printer trouble shooting expert system as an example. This is an example of the structures of an ITT, an AT, an AVT, a CTT, and a CQL of a real design.

FIG. 8a shows ITT 81 and AT 82. These two tables are selected from a printer trouble shooting manual and can be inputted directly into the invented automatic expert system by the user.

FIG. 8b shows AVT 83, CTT 84, and CQL 85 of this specific design. AVT 83 is created by the applicant based on ITT 81. CTT 84 is created by the TE and is stored in the memory of the computer. Each entry of CTT 84 is a code of the value in the corresponding entry of ITT 81. And the code of the value is chosen as the sequence number of the value in its value-list in AVT 83. CQL 85 is created by AIE before an querying session starts. This example displays the relationships among ITT, CTT, and AVT of a real design.

Acronym

AIE : Automatic Inference Engine.
AT : Action Table.
AVT : Attribute-Value Table.
CTT : Code Truth Table.
CPU : Central Process Unit.
CQL : Code Query List.
DBMS: Database Management System.
IKB : Input Knowledge Base.
ITT : Input Truth Table.
KB : Knowledge Base.
KBES: Knowledge-Based Expert System.
KBFT: Knowledge Base Format Table.
RDBMS: Relational Database Management System.
SKB : Stored Knowledge Base.
TE : Transfer Engine.

I claim:

1. An automatic expert system in a digital computer for designing, developing, and implementing expert systems comprising:
    an input/output device for performing input by the user;
    a computer storing means for storing data and computer programs;
    said input/output device comprising a set of input truth tables forming an input knowledge base inputted by the user being a domain expert's knowledge, each of said input truth tables having a plurality of columns representing attributes and a plurality of rows representing instances, intersections of said columns and said rows being entries storing inputted values;
    a set of action tables inputted by the user and stored in said computer storing means, each one of said action tables being a corresponding action table of one of said input truth tables and comprising a plurality of rows and a plurality of columns, each one of said columns having a set of entries storing inputted action statements, and each one of said rows being a corresponding action row of one of said rows in said one of said input truth tables;
    a stored knowledge base in said computer storing means, comprising a set of code truth tables in the form of arrays, each one of said code truth tables being a corresponding code truth table of one of said input truth tables and having a plurality of columns, a plurality of rows, and a plurality of entries, each one of said entries being a corresponding entry of one of said entries in said one of said input truth tables, and a code assigned by the user to each one of said inputted values being in said corresponding entry of said corresponding code truth table;
    a transfer engine for transferring each one of said input truth tables to said corresponding code truth table, and for transferring said corresponding code truth table back to said one of said input truth tables;
    an automatic inference engine for reasoning said stored knowledge base, comprising:
    means for scanning all entries in one of said code truth tables;
    means for querying the user for responses regarding columns in said one of said code truth tables;
    means for transferring each of said responses to a code of response;
    means for storing said code of response in said computer storing means;
    means for comparing said code of response with the code in said one of said code truth tables;
    means for determining a row in said one of said code truth tables to be true or false; and
    means for executing said action statements in said corresponding action row.

2. The expert system in claim 1 wherein said input-/output device comprises:
    means for all input truth tables in said input knowledge base,
    for creating an input truth table with empty entries,
    for creating an attribute-value table taking said input truth table with empty entries as a corresponding input truth table, said attribute-value table having a plurality of columns, each of said columns having a corresponding attribute in said corresponding input truth table and having an associated value-list in said attribute-value table, and, for all associated value-lists in said attribute-value table,
    for inputting permissible values for said corresponding attribute into said associated value-lists in said attribute-value table,
    for selecting values from said associated value-lists and writing said values into said empty entries in said corresponding attribute in said input truth table, and
    for assigning codes to said permissible values in said associated value-lists.

3. The expert system in claim 1 wherein said transfer engine for transferring said input knowledge base to said stored knowledge base comprises:
    means, for all input truth tables in said input knowledge base,
    for creating a corresponding code truth table for one of said input truth tables in the form of an array having the same total column number and the same total row number as said one of said input truth table,
    for scanning all entries in said one of said input truth tables and reading values in said entries,
    for finding codes of said values from associated value-lists in the corresponding attribute-value table, and
    for writing said codes of said values into corresponding entries in said corresponding code truth table.

4. The expert system in claim 1 wherein said automatic inference engine for reasoning said stored knowledge base comprises:
    means for opening one of said code truth tables if an executed action statement instructs to do so,
    for creating a code query list in the form of a temporary single-rowed array in said computer storing means, said code query list having the same number of columns as said one of said code truth tables, each column in said code query list being a corresponding column of one of said columns in said one of said code truth tables and having a single entry storing a code transferred from a response obtained by said means for querying, for scanning all entries in said one of said code truth tables and using said means for comparing to compare non-blank entries in said one of said code truth tables with the entries in the corresponding columns in said code query list;

said means for querying comprising means for querying the user for a response regarding said corresponding column, if said entry in said corresponding column in said code query list is unknown;

said means for transferring comprising means for transferring said response to said code of response;

means for storing said code of response in said entry in said corresponding column in said code query list;

said means for determining comprising means for determining which one of said rows in said one of said code truth tables is true; and means for executing said action statements in said corresponding action row.

5. The expert system of claim 1 wherein said input/output device comprises means for merging one of said input truth tables with said corresponding action table to form a new input truth table, said new input truth table comprising two sets of columns, one set of said columns mapped from said one of said input truth tables and another set of said columns mapped from said corresponding action table, and said new input truth table also comprising a plurality of rows, each of said rows being a union of two rows, one row from said one of said input truth tables and another row being said corresponding action row from said corresponding action table.

* * * * *

UNITED STATES PATENT AND TRADEMARK OFFICE
CERTIFICATE OF CORRECTION

PATENT NO. : 5,263,126
DATED : November 16, 1993
INVENTOR(S) : Hou-Mei Henry Chang It is certified that error appears in the above-indentified patent and that said Letters Patent is hereby corrected as shown below:

On the title page, item [57] Abstract, line 11, start from the last word, delete "and no matter what the size of the input knowledge base is,".

Column 4, line 7, delete the "," after word 10 "is".
Column 4, line 48, replace the 8th word "ANY" with "any".
Column 8, line 21, word 5, replace "SBK" with "SKB".
Column 12, line 26, after word 1 "means" insert a ",".

Signed and Sealed this

Twenty-fifth Day of October, 1994

Attest:

BRUCE LEHMAN

Attesting Officer

Commissioner of Patents and Trademarks